(12) United States Patent
Lu et al.

(10) Patent No.: US 10,216,704 B1
(45) Date of Patent: *Feb. 26, 2019

(54) NATIVE TENSOR PROCESSOR, AND SYSTEMS USING NATIVE SENSOR PROCESSORS

(71) Applicant: NovuMind Limited, Grand Cayman (KY)

(72) Inventors: Chien-Ping Lu, Cupertino, CA (US); Yu-Shuen Tang, Hsinchu (TW)

(73) Assignee: NOVUMIND LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,816

(22) Filed: Jul. 20, 2017

Related U.S. Application Data

(63) Continuation of application No. 15/593,192, filed on May 11, 2017.

(51) Int. Cl.
    *G06F 17/16* (2006.01)
    *G06F 17/14* (2006.01)

(52) U.S. Cl.
    CPC .............. *G06F 17/16* (2013.01); *G06F 17/14* (2013.01)

(58) Field of Classification Search
    CPC ....................................................... G06F 7/16
    See application file for complete search history.

(56) References Cited

U.S. PATENT DOCUMENTS

| | | |
|---|---|---|
| 6,901,422 B1 | 5/2005 | Sazegari |
| 9,830,302 B1 | 11/2017 | Rub |
| 2002/0138536 A1 | 9/2002 | Jang et al. |
| 2007/0028076 A1* | 2/2007 | Wezelenburg ...... G06F 9/30036 712/22 |
| 2011/0153707 A1 | 6/2011 | Ginzburg et al. |
| 2013/0262548 A1* | 10/2013 | Ge .......................... G06F 17/16 708/520 |

(Continued)

OTHER PUBLICATIONS

Hemsoth, N., "First In-Depth Look at Google's TPU Architecture," The Next Platform, Apr. 5, 2017, 13 pages, [Online] [Retrieved on Oct. 16, 2017] Retrieved from the Internet<URL:https://www.nextplatform.com/2017/04/05/first-depth-look-googles-tpu-architecture/?from=timeline&isappinstalled=0>.

(Continued)

*Primary Examiner* — Chuong D Ngo
(74) *Attorney, Agent, or Firm* — Fenwick & West LLP

(57) ABSTRACT

A native tensor processor calculates tensor contractions using a sum of outer products. In one implementation, the native tensor processor preferably is implemented as a single integrated circuit and includes an input buffer and a contraction engine. The input buffer buffers tensor elements retrieved from off-chip and transmits the elements to the contraction engine as needed. The contraction engine calculates the tensor contraction by executing calculations from an equivalent matrix multiplications, as if the tensors were unfolded into matrices, but avoiding the overhead of expressly unfolding the tensors. The contraction engine includes a plurality of outer product units that calculate matrix multiplications by a sum of outer products. By using outer products, the equivalent matrix multiplications can be partitioned into smaller matrix multiplications, each of which is localized with respect to which tensor elements are required.

20 Claims, 16 Drawing Sheets

(56) References Cited

U.S. PATENT DOCUMENTS

| | | | |
|---|---|---|---|
| 2014/0181171 A1* | 6/2014 | Dourbal | G06F 17/16 |
| | | | 708/607 |
| 2016/0204795 A1* | 7/2016 | Huang | H03M 7/30 |
| | | | 341/87 |
| 2017/0270073 A1* | 9/2017 | Badin | G06N 3/00 |
| 2018/0046901 A1 | 2/2018 | Xie et al. | |

OTHER PUBLICATIONS

Jouppi, N.P. et al., "In-Datacenter Performance Analysis of a Tensor Processing Unit™," To appear at $44^{th}$ International Symposium on Computer Architecture (ISCA), Toronto, Canada, Jun. 26, 2017, pp. 1-17, [Online] [Retrieved on Oct. 16, 2017] Retrieved from the Internet<URL:https://drive.google.com/file/d/0Bx4hafXDDq2EMzRNcy1vSUxtcEk/view>.

United States Office Action, U.S. Appl. No. 15/593,192, dated May 18, 2018, 8 pages.

\* cited by examiner

NATIVE TENSOR PROCESSOR, AND SYSTEMS USING NATIVE SENSOR PROCESSORS

CROSS-REFERENCE TO RELATED APPLICATION(S)

This application is a continuation of U.S. patent application Ser. No. 15/593,192, "Native Tensor Processor, Using Outer Product Unit," filed May 11, 2017. The subject matter of the foregoing is incorporated herein by reference in its entirety.

BACKGROUND

1. Field of the Invention

This disclosure relates generally to tensor processing, including tensor contractions.

2. Description of Related Art

With advances in technology, increasingly more data is being created and analyzed every day. Machine learning techniques, such as deep learning and convolutional neural networks, are also gaining importance every day as an approach to analyzing these large amounts of data. However, computing performance for such large tasks has been increasingly dominated by the cost of moving data to the right processing elements for computation.

Conventional parallel processors have been struggling to handle these data volumes and the resulting data movement patterns. In many conventional parallel processing architectures, including typical GPU architectures, the computing units are arranged in one-dimensional arrays up to three-dimensional meshes. However, the computing units typically must themselves retrieve data from memory. As a result, techniques such as register files, cache and scratch memory are used to reduce memory latency. However, this requires the addition of more circuitry on the integrated circuit and more energy to power the circuitry.

Programmable dataflow machines are an alternate approach. However, the generic dependencies among fine-grain data items typically results in complexity and inefficiency.

Spatial dataflow machines, such as systolic arrays, are another alternate approach in which the processing elements are arranged in a mesh topology and can communicate only with their neighbors. However, this causes latency and is difficult to scale.

Custom integrated circuits can be designed to be efficient for their intended application. However, it is expensive to build a custom integrated circuit and, once built, it is also expensive to build an updated version if the requirements of the application change. Custom hardware can also quickly become out of date as technology progresses.

Thus, there is a need for better approaches to tensor processing.

SUMMARY

The present disclosure overcomes the limitations of the prior art by providing a native tensor processor that calculates tensor contractions using a sum of outer products.

In one implementation, the native tensor processor preferably is implemented as a single integrated circuit and includes an input buffer and a contraction engine. The input buffer buffers tensor elements retrieved from off-chip and transmits the elements to the contraction engine as needed. It may be a double buffer, so that retrieving tensor elements from off-chip can be optimized apart from feeding the elements to the contraction engine. The contraction engine calculates the tensor contraction by executing calculations from an equivalent matrix multiply, as if the tensors were unfolded into matrices, but avoiding the overhead of expressly unfolding the tensors. The contraction engine includes a plurality of outer product units that calculate outer products. The contract engine sums the outer products to form the final product for the matrix multiply.

By using outer products, the equivalent matrix multiply can be partitioned into smaller matrix multiplies, each of which is localized with respect to which tensor elements are required.

Because of the outer product structure, the partitioning is scalable. The contraction engine typically has a hierarchical structure that partitions the full matrix multiply downwards into atomic outer products through a series of distribution layers (scattering and/or broadcasting), and then reverses this process by the corresponding collection layers (gathering and/or reducing) after calculation. The hardware capacity of the contraction engine can be expanded by extending the hierarchy upwards—including higher-level distribution layers to build larger and larger contraction engines. The contraction engine preferably is reconfigurable so that these layers can be changed to implement processing for different size tensors.

The atomic outer products preferably are outer products $\alpha \times \beta$ where $\alpha$ is an $\iota \times 1$ column vector and $\beta$ is a $1 \times \varphi$ row vector, and the processing element that calculates these atomic outer products preferably also accumulates the outer products $\alpha \times \beta$ over the contraction index.

The outer product architecture also reduces data transfer time because data use is localized for each outer product. Generally, the data required for one outer product calculation is not dependent on the results of another outer product calculation. Thus, the calculations can be performed in parallel without data dependencies and data transfer within the contraction engine preferably can be done on an asynchronous basis (i.e., flowing through the contraction engine with a reduced number of clocked registers) or at least on a pipelined basis when clocked registers are used.

The native tensor processor may also include an element-wise processing engine that performs element-by-element operations between tensors of the same size, an activation engine that applies a non-linear function to tensor elements, and/or pre- and post-transform engines that convert other types of operations into equivalent matrix multiplications.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

FIG. 4A illustrates a matrix multiply as a sum of outer products of columns and rows.

FIG. 4B illustrates a sum of outer products where the columns and rows are subdivided.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
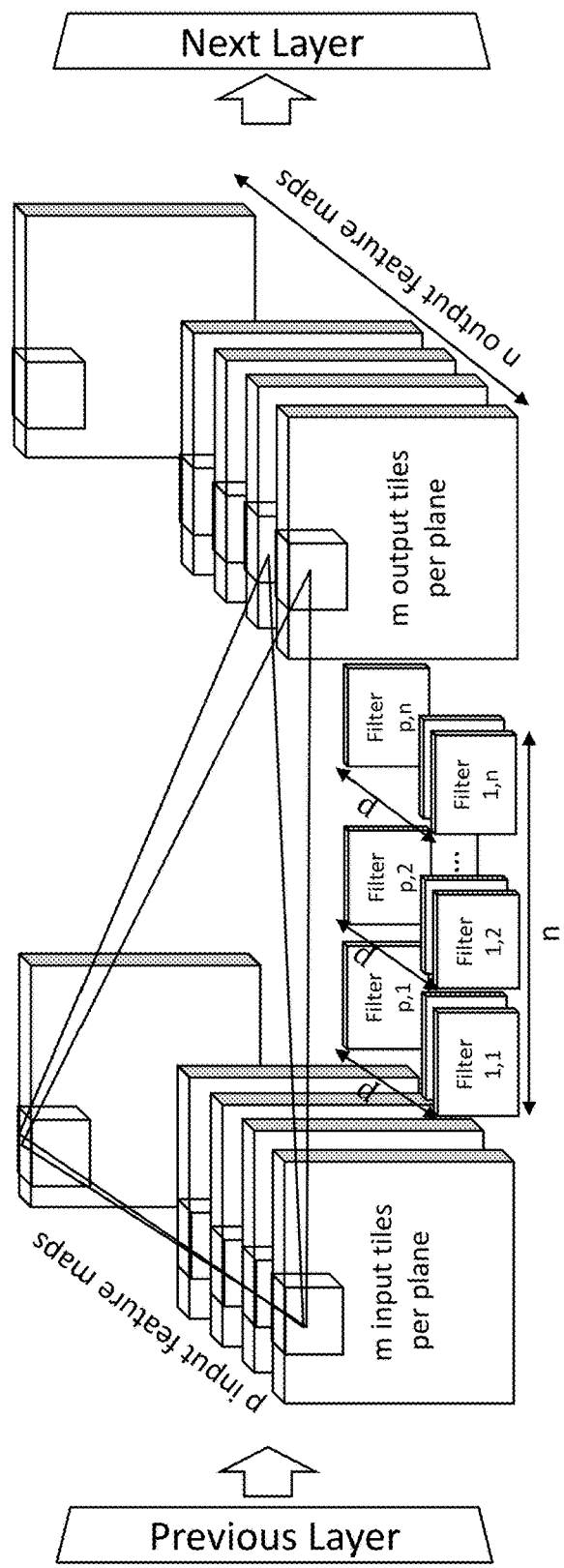
FIG. 1 is a diagram of a layer of a deep convolutional neural network.

Many deep learning, neural network, convolutional neural network, supervised machine learning and other machine learning models use a multi-layer architecture with tensor processing between the layers. FIG. 1 is a diagram of one layer of a deep convolutional neural network. In this example, the previous layer provides p input feature maps (input planes), each with m input tiles per plane. The p input planes are filtered by a p×n bank of filters, yielding a next layer with n output feature maps (output planes), each with m output tiles per plane.

The processing between layers typically includes a tensor contraction, or processing that can be expressed as a tensor contraction. Tensor contraction is the extension of the matrix cross product to higher-dimensional tensors. In a tensor contraction TX×TY=TZ, the two inputs tensors TX and TY each have multiple dimensions, some of which are common and are eliminated in the contraction. The eliminated dimensions are referred to as the contraction indices, and the non-eliminated dimensions are referred to as the free indices. The product tensor TZ has dimensionality determined by the free indices.

In addition to tensor contraction, the processing often also includes element-by-element operations between tensors of the same size and "activation" functions applied to tensors. A common element-by-element operation is the linear combination of two tensors, expressed as aTX+bTY=TZ, where the inputs tensors TX and TY and output tensor TZ are all the same size, and a and b are scalars. A common activation function is σ(TX)=TZ, where σ( ) is a non-linear function applied to each element of input tensor TX to yield the output tensor TZ.

Between tensor contraction, element-wise operations and activation functions, the computation and communication burden is typically dominated by tensor contraction. Tensor contraction typically requires significantly more computation than the other two operations, and also typically requires significantly more moving around of tensor elements in order to complete those calculations. All of these operations may be implemented in software but, given the size of machine learning models, it is preferable to accelerate these calculations by implementing the functions in hardware, such as in integrated circuits. However, the hardware preferably uses an architecture that has the flexibility and scalability to expand its capacity to accommodate different size tensors.

Figure 2:
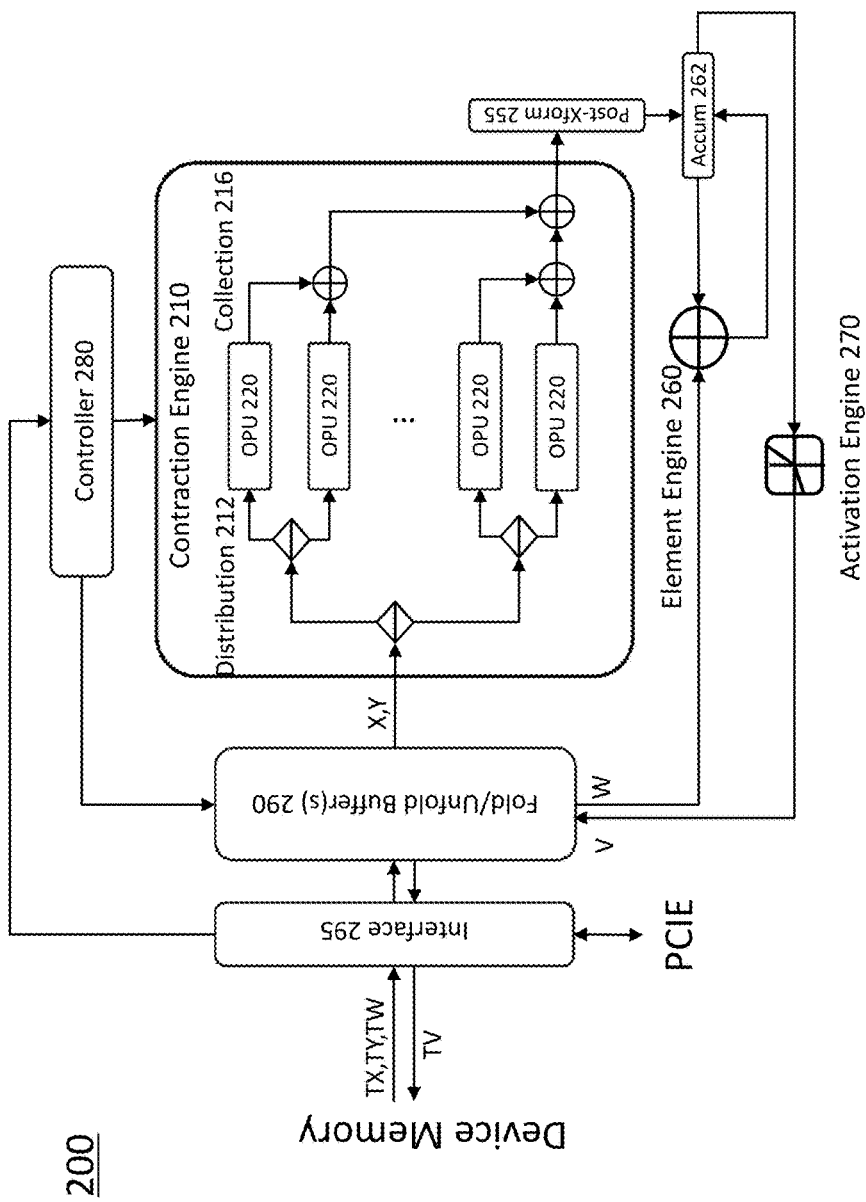
FIG. 2 is a block diagram of one embodiment of a native tensor processor.

FIG. 2 is a block diagram of one embodiment of a native tensor processor, preferably implemented as a single integrated circuit. The native tensor processor 200 includes a contraction engine 210, and optionally also an element-wise processing engine 260 and an activation engine 270. The native tensor processor 200 also includes a controller 280, input and output buffer(s) 290 and interface(s) 295 to other parts of the computer system. In this example, the interfaces 295 are used to communicate with a device memory where the tensor elements are stored and also to communicate with a host processor using PCIExpress.

The device memory stores tensor elements for tensors TX, TY and TW. The native tensor processor 200 retrieves these elements from the device memory and calculates the output tensor TV=σ(a(TX×TY)+b(TW)). The contraction engine 210 calculates the contraction TX×TY=TZ and outputs this to the element-wise processing engine 260. The element-wise processing engine 260 (using accumulator 262) calculates the linear combination a(TZ)+b(TW) and outputs this to the activation engine 270, which applies the nonlinear function σ( ). The resulting tensor TV is output via interface 295 back to the device memory.

Figure 3:
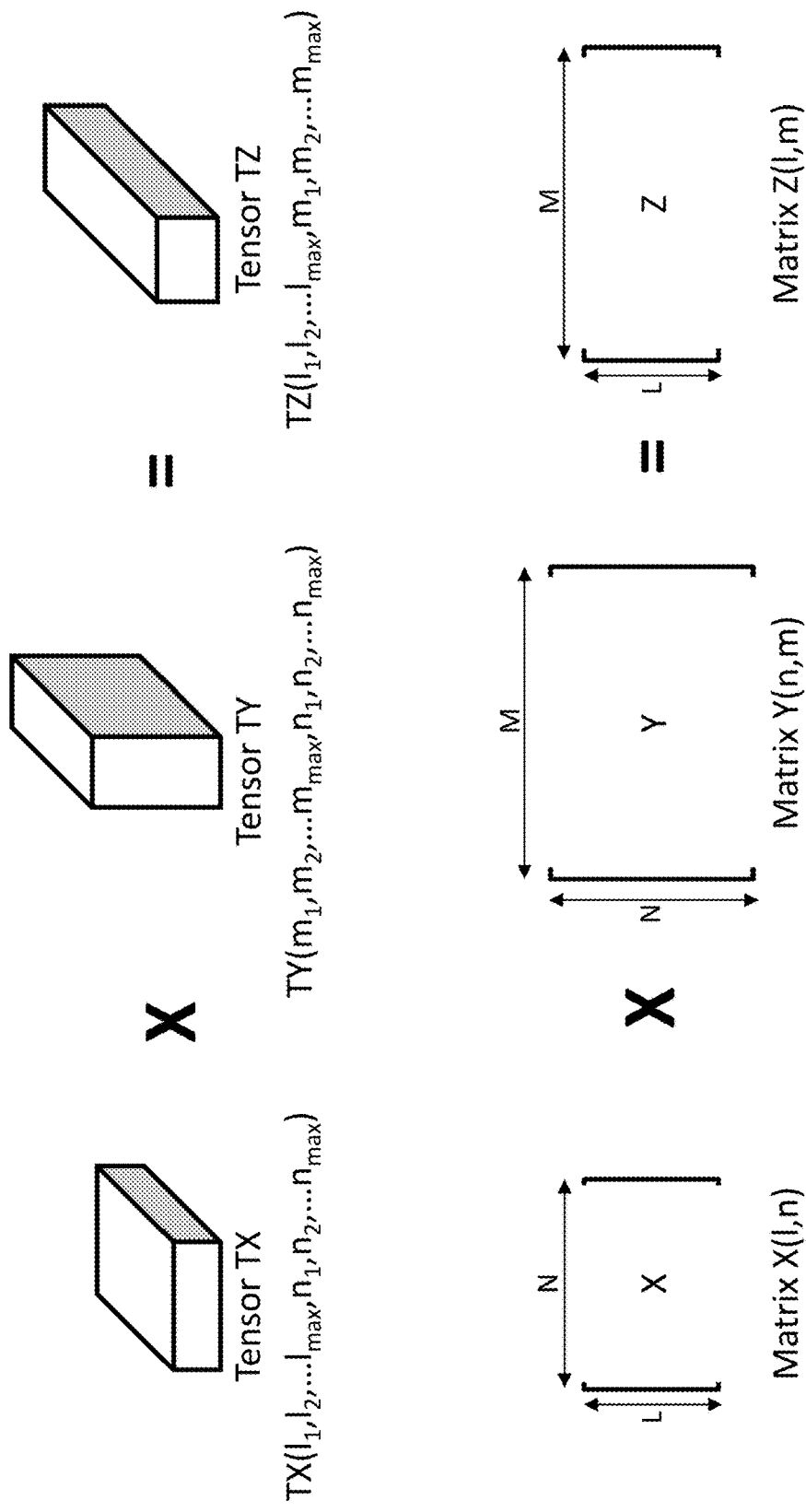
FIG. 3 illustrates conversion of a tensor contraction to a matrix cross product (matrix multiply).

Tensor operations can be described as equivalent matrix operations. FIG. 3 illustrates conversion of a tensor contraction TX×TY=TZ to an equivalent matrix cross product (matrix multiply) X×Y=Z. In the tensor version, tensor TX has dimensions $(l_1, l_2, \ldots, l_{max}, n_1, n_2, \ldots, n_{max})$ and tensor TY has dimensions $(m_1, m_2, \ldots, m_{max}, n_1, n_2, \ldots, n_{max})$. The indices $\{l_1, l_2, \ldots, l_{max}\}$ and $\{m_1, m_2, \ldots, m_{max}\}$ are the free indices, and the indices $\{n_1, n_2, \ldots, n_{max}\}$ are the contraction indices. To convert the tensors to equivalent matrices, reorder each set of indices as a single dimension. Let $l=\{l_1, l_2, \ldots, l_{max}\}$, $m=\{m_1, m_2, \ldots, m_{max}\}$ and $n=\{n_1, n_2, \ldots, n_{max}\}$, where l=1 ... L, m=1 ... M and n=1 ... N. The equivalent matrices X(l,n), Y(n,m), Z(l,m) then have dimensions L×N, N×M and L×M, respectively. For the matrix multiply shown in FIG. 3, the free indices are l,m, and the contraction index is n.

The process of converting from tensors to equivalent matrices is referred to as unfolding and the reverse process is referred to as folding. In traditional approaches, tensors are expressly unfolded into their matrix equivalents, for example the tensor elements may be read from memory and then restored in an order conducive to matrix operations. Matrix operations are then performed on the elements stored in matrix order. The matrix results are then expressly folded back to tensor form. However, this folding and unfolding can become unwieldy and require large amounts of inefficient and repetitive data transfer as the tensors become large.

Much of the function of native tensor processor 200 is described using matrices based on this tensor-matrix equivalency. However, the native tensor processor 200 does not expressly unfold and fold between tensor and matrix forms. This is because the architecture of the contraction engine 210 does not require the reading of large numbers of elements from a matrix storage order. Rather, the contraction engine 210 consumes elements in relatively small chunks, so the chunks can be retrieved directly from their tensor storage format without first expressly unfolding them into a matrix order. This is effected by the controller 280 controlling the order of retrieval of tensor elements into the input buffer 290. For this reason, the input buffer 290 will sometimes be referred to as an unfold buffer, although it is really the controller 280 (or the host processor) that effectively implements the unfolding by retrieving tensor elements in the order consumed by the contraction engine. Similarly, the output buffer 290 will sometimes be referred to as a fold buffer. In FIG. 2, the block 290 includes both the input and output buffers. This implicit in-line hardware unfolding and folding resulting from the control of tensor elements into and out of the buffers 290 is advantageous because it decouples how the tensor elements are arranged in memory from how they are consumed in the native tensor processor. This, in turn, avoids unnecessary data copying and transfer compared to approaches that implement express folding/unfolding.

In one design, the input and output buffers 290 are double buffers. The input buffer 290 includes a first buffer that buffers the retrieval of tensor elements from the device memory. It also includes a second buffer that buffers transmission of the retrieved tensor elements to the contraction engine 210. The contraction engine 210 may consume elements in a different order than they are retrieved from the device memory or the tensor elements may be retrieved from the device memory in data chunks that are different size (typically larger) than those used to transmit the tensor elements to the contraction engine. Double buffering can be used to efficiently bridge these differences. For similar reasons but in the reverse direction, the output buffer 290 may also be a double buffer.

Referring again to FIG. 2, the contraction engine 210 calculates the contraction of tensors $TX \times TY = TZ$ by executing calculations that effect a matrix multiply of the equivalent matrices $X \times Y = Z$. It uses a sum of outer products to perform the matrix multiply. The contraction engine 210 includes a distribution section 212, a processing section that includes a plurality of outer product units (OPUs) 220, and a collection section 216. The OPUs 220 calculate the outer products. The distribution section 212 partitions the full matrix multiply $X \times Y$ into component outer product calculations, which are performed by the OPUs 220. The collection section 216 sums the component outer products into the full product Z for the matrix multiply $X \times Y$.

The distribution 212 and collection 216 sections include a plurality of collective streaming elements (CEs), which will be described in greater detail below. CEs in distribution sections typically perform scattering and/or broadcasting. CEs in collection sections typically perform gathering and/or reduction. The CEs in the distribution section 212 of FIG. 2 are primarily scattering, and those in the collection section 216 of FIG. 2 are primarily reduction.

Figures 4A, 4B:
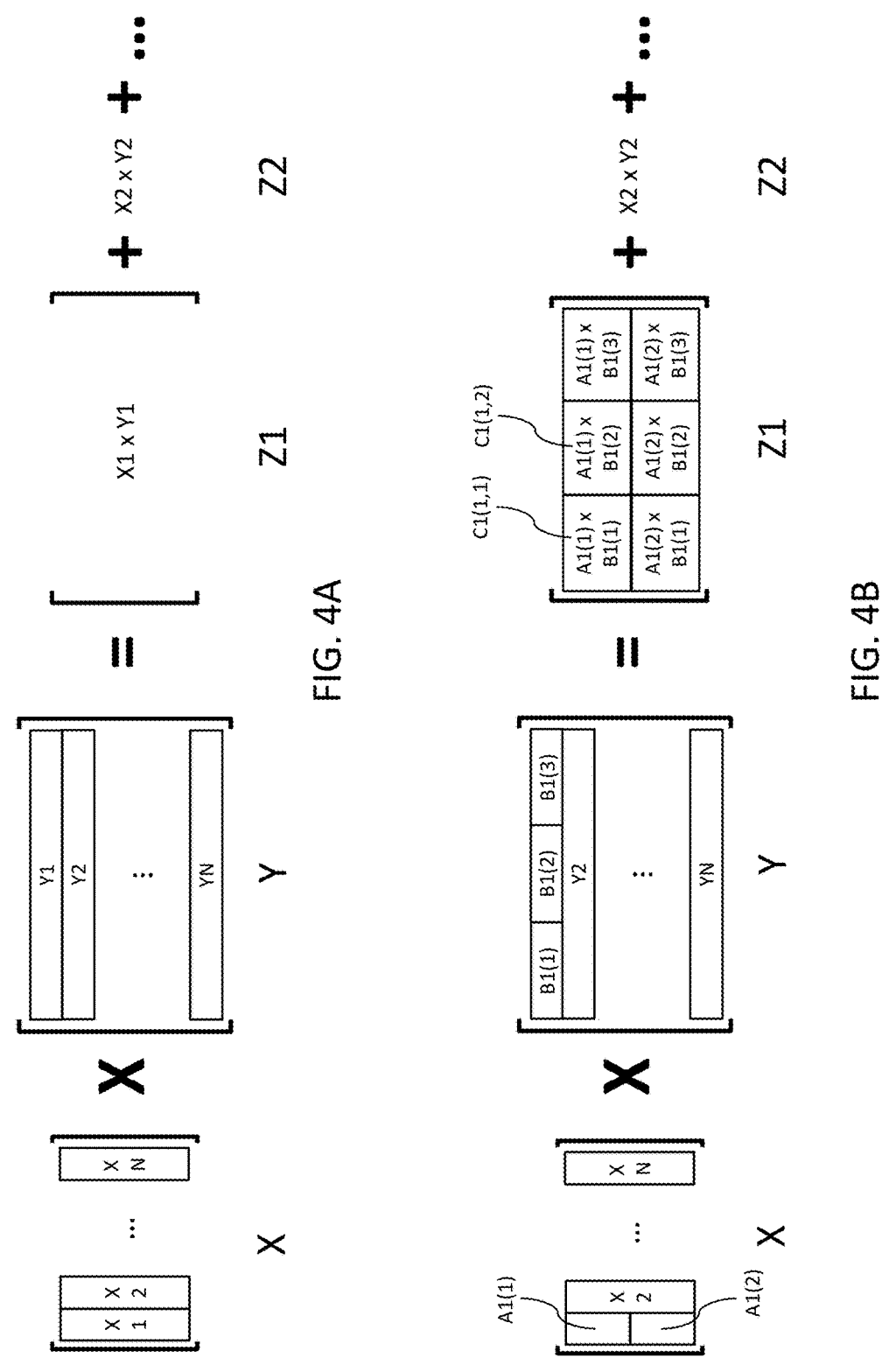

FIGS. 4A and 4B illustrate different ways to partition a matrix multiply $X \times Y$. In FIG. 4A, the matrix X is shown as columns X1 ... XN and the matrix Y is shown as rows Y1 ... YN. The matrix product $X \times Y = X1 \times Y1 + X2 \times Y2 + ... + XN \times YN$. For convenience, define $Zn = Xn \times Yn$. Note that the columns Xn and rows Yn could be block columns and block rows. That is, Xn could contain multiple columns with Yn containing the same number of corresponding rows. Note that each outer product Zn is calculated using only the corresponding column Xn and row Yn. Conversely, for a specific value of $n=n_o$, the elements in column $Xn_o$ and row $Yn_o$ are used to calculate only the outer product $Zn_o$ but are not used to calculate outer products Zn for any other values of n.

In FIG. 4B, the column X1 is divided into A1(1) and A1(2), and the corresponding row Y1 is divided into B1(1), B1(2) and B1(3). The outer product $X1 \times Y1 = Z1$ then has six components, corresponding to $A1(1) \times B1(1)$, $A1(1) \times B1(2)$ and so on. For convenience, define $Cn(l,m) = An(l) \times Bn(m)$. That is, the product $A1(1) \times B1(1) = C1(1,1)$, $A1(1) \times B1(2) = C1(1,2)$ and so on. The other outer products $Z2 ... Zn$ could also be subdivided in a similar fashion. The upper left section of Z1 is $C1(1,1) = A1(1) \times B1(1)$, the upper left section of Z2 is $C2(1,1) = A2(1) \times B2(1)$, and so on to the upper left section of ZN is $CN(1,1) = AN(1) \times BN(1)$. The upper left section of the full product Z, which shall be denoted as $C(1,1)$, is given by $C(1,1) = C1(1,1) + C2(1,1) + ... + CN(1,1)$. That is, the full outer product $X1 \times Y1$ does not have to be calculated all at once. It can be calculated separately as the sum of outer products for each section $C(l,m)$. Furthermore, as with the partitioning shown in FIG. 4A, the use of elements is fairly localized. A1(1) is used only to calculate $C1(l,m) = A1(1) \times B1(m)$. More generally, for specific values of $l=l_o$ and $n=n_o$, $An_o(l_o)$ is used to calculate only $Cn_o(l_o,m)$ but is not used to calculate $Cn(l,m)$ for other values of l and n. A similar situation is also true for the components $Bn(m)$.

FIGS. 4A and 4B show different ways to partition the matrix multiply $X \times Y$. In FIG. 4A, the matrix multiply was partitioned with respect to the contraction index n. The component calculations are then summed together to produce the full product. In FIG. 4B, the matrix multiply was partitioned with respect to the free indices l,m. The component calculations represent different sections of the full product and are merged together to produce the full product.

In the native tensor processor, these types of partitioning can be performed by hardware parallelism or by time division multiplexing. When hardware parallelism is used, the hardware that implements the partitioning will be referred to as a distribution section. The hardware that reverses the partitioning will be referred to as a collection section. Individual elements will be referred to as collective streaming elements, which includes both the distribution side and the collection side. In general, scattering over the contraction index on the distribution side will have a corresponding reduction (i.e., summing) on the collection side, and scattering over the free indices on the distribution side will have a corresponding gathering (i.e., merging) on the collection side.

Note also that the partitioning shown in FIGS. 4A and 4B can be applied repeatedly or recursively. The full matrix multiply can be partitioned into component calculations using any of the techniques shown, which can be further partitioned into sub-component calculations, which can be further partitioned into sub-sub-component calculations, and so on. The finest grain calculation performed by the native tensor processor 200 will be referred to as the atomic outer product, and the hardware that performs this calculation will be referred to as an atomic processing element (APE). The atomic outer product could be a scalar multiplication, which is the outer product of a 1×1 by 1×1 matrix multiply, or it could be larger. In the detailed example given below, the atomic outer product is a 6×1 by 1×6 matrix multiply. The native tensor processor partitions the full matrix multiply into atomic outer products through a combination of hardware parallelism and time division multiplexing, as will be described in further detail below.

Figure 5A:
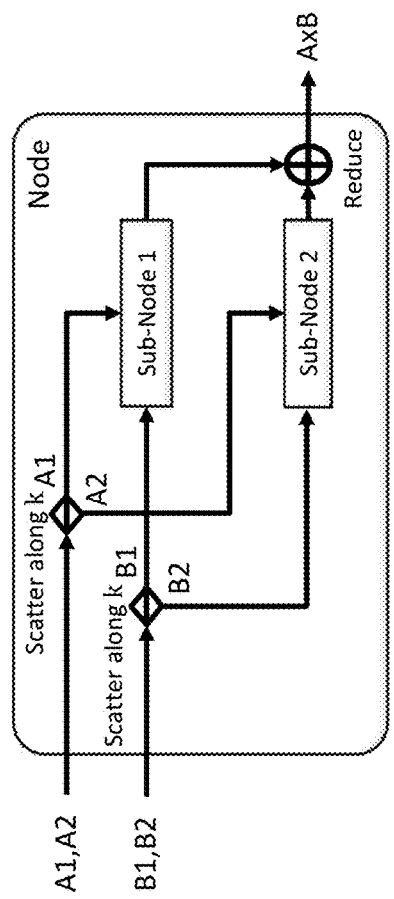
FIG. 5A illustrates partitioning of a matrix multiply by scatter-reduction along the contraction index k.
Figure 5B:
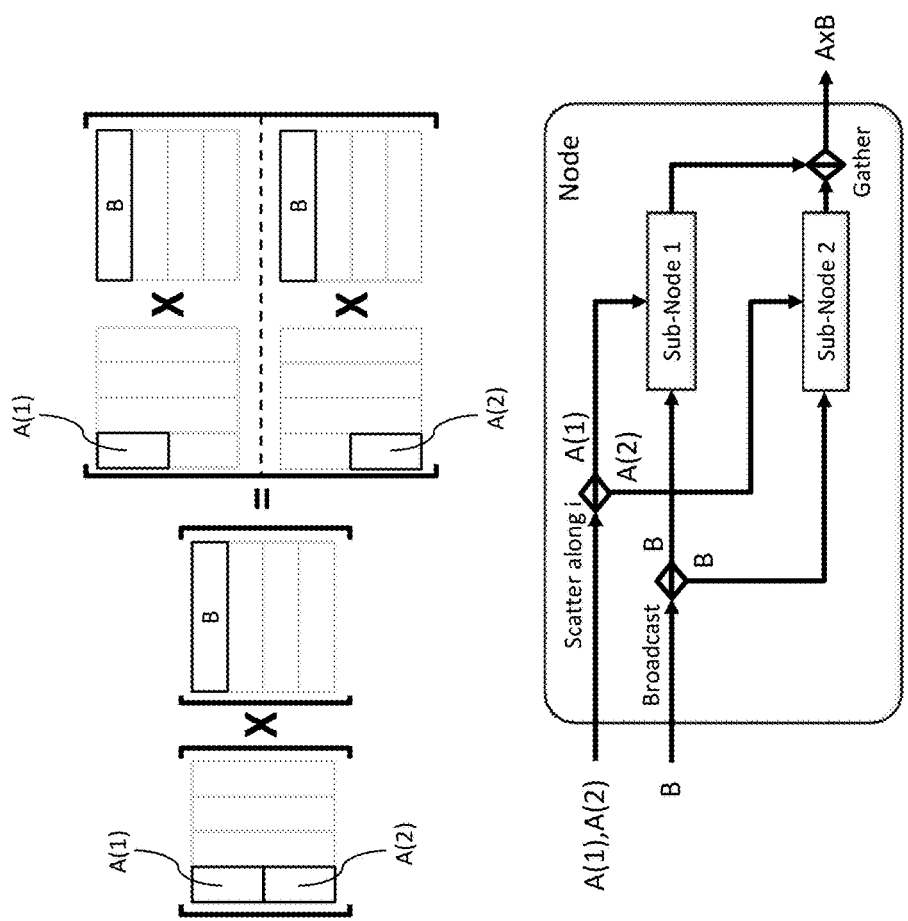
FIG. 5B illustrates partitioning of an outer product by scatter-gather along the free index i.
Figure 5C:
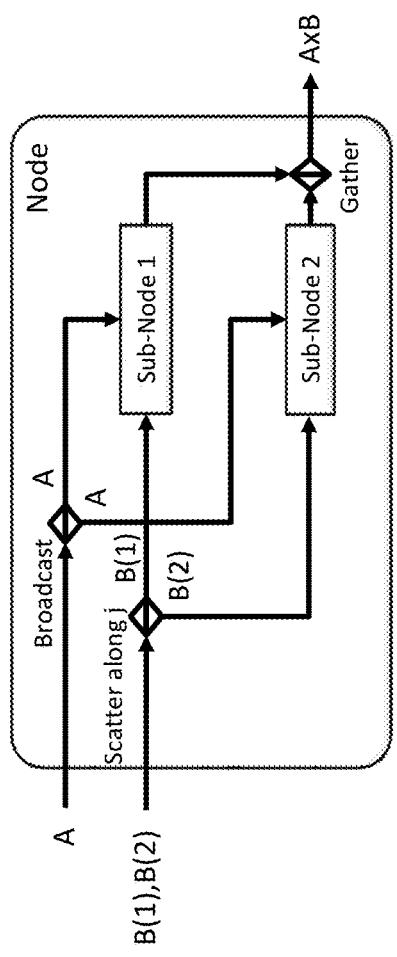
FIG. 5C illustrates partitioning of an outer product by scatter-gather along the free index j.

FIGS. 5A-5C illustrate hardware implementations of the different types of partitioning shown in FIGS. 4A-4B. In these figures, a processing node is responsible for calculating the outer product A×B. Here, the matrices A and B are used, rather than X and Y, because this node may occur anywhere in the hierarchy of the contraction engine. Thus A and B may be the full X and Y, or they may be components, sub-components, sub-sub-components, etc. of X and Y. X and Y use the indices l, m, n. Because A and B may or may not be the same size, the indices for A and B are changed to i, j, k, where i,j are the free indices and k is the contraction index. A is an I×K matrix, and B is a K×J matrix.

FIG. 5A shows partitioning with respect to the contraction index k, which corresponds to FIG. 4A. FIG. 5B shows partitioning with respect to the free index i, which corresponds to the partitioning of A1 in FIG. 4B. FIG. 5C shows partitioning with respect to the free index j, which corresponds to the partitioning of B1 in FIG. 4B.

In FIG. 5A, matrix A is divided along the contraction index k into columns A1,A2 and matrix B is also divided along k into corresponding rows B1,B2. The node calculating A×B includes a distribution section denoted by the two diamonds with horizontal lines, a processing section with sub-nodes 1 and 2, and a collection section denoted by the circle with plus sign. The distribution section scatters each of A and B with respect to the contraction index k. Thus, A1,B1 are directed to sub-node 1 which calculates A1×B1, and A2,B2 are directed to sub-node 2 which calculates A2×B2. The collection section is a reduction section that sums the two outer products to yield A×B.

In FIG. 5B, matrix A is divided along the free index i into sub-columns A(1),A(2) and matrix B is not divided. In this node, the distribution section scatters A and broadcasts B. Thus, A(1) is directed to sub-node 1 and A(2) is directed to sub-node 2, while B is broadcast to both sub-nodes. Sub-node 1 calculates A(1)×B and sub-node 2 calculates A(2)×B. The collection section, denoted by the diamond with vertical line, is a gathering section and merges the two outer products with respect to index i to yield A×B.

FIG. 5C is analogous to FIG. 5B, but dividing matrix B along the free index j into the sub-rows B(1) and B(2). In this node, A is broadcast and B is scattered. Sub-node 1 calculates A×B(1) and sub-node 2 calculates A×B(2). The collection section merges the two outer products with respect to index j.

The above examples partition one calculation into two sub-calculations. That can be used advantageously to construct binary trees for the distribution and collection sections. However, calculations can also be partitioned into more than two sub-calculations, and tree structures other than binary trees can be used.

In addition, note that in each of the FIGS. 5A-5C, the two sub-nodes can perform their calculations in parallel. Neither sub-node is dependent on the results of the other sub-node's calculation. As mentioned previously, the techniques shown in FIGS. 5A-5C can be applied recursively, so that each sub-node is further partitioned into sub-sub-nodes and so on. The data independence between sub-nodes preferably is maintained all the way down to the lowest level sub-nodes, so that each lowest level sub-node can perform its calculation without data dependency on the other lowest level sub-nodes, thus eliminating at least reducing data transfer between sub-nodes.

The different sections in FIGS. 5A-5C can also be implemented in different ways. Hardware parallelism (e.g., parallel hardware data paths), time division multiplexing and packet switching are possible examples. Using FIG. 5B as an example, in hardware parallelism, the input to the node might be fully parallel, with the node receiving both A1 and A2 at the same time on parallel data paths. The A1 data paths lead to sub-node 1 and the A2 data paths lead to sub-node 2, thus implementing the scatter. In time division multiplexing (technically, demultiplexing, but "multiplexing" will be used to refer to both the multiplexing and demultiplexing directions), the A1 elements might be received during a first timeslot and directed to sub-node 1. The A2 elements are received during a second timeslot and directed to sub-node 2. In packet switching, the A1 packets contain a header directing them to sub-node 1, and the A2 packet header directs them to sub-node 2.

Referring again to FIG. 2, the native tensor processor 200 optionally also includes a pre-transform engine (not shown in FIG. 2) and a post-transform engine 255. In FIG. 2, the pre-transform engines are in the OPUs prior to the matrix multiply circuitry, and the post-transform engine 255 is after the collection section 216. The pre-transform engine applies a transform before performing the matrix multiply, and the post-transform engine 255 then applies the inverse transform to the result. In this way, operations that are not matrix multiplies can be performed by the contraction engine 210. Some examples are given below in the discussion of FIG. 6.

Figure 6:
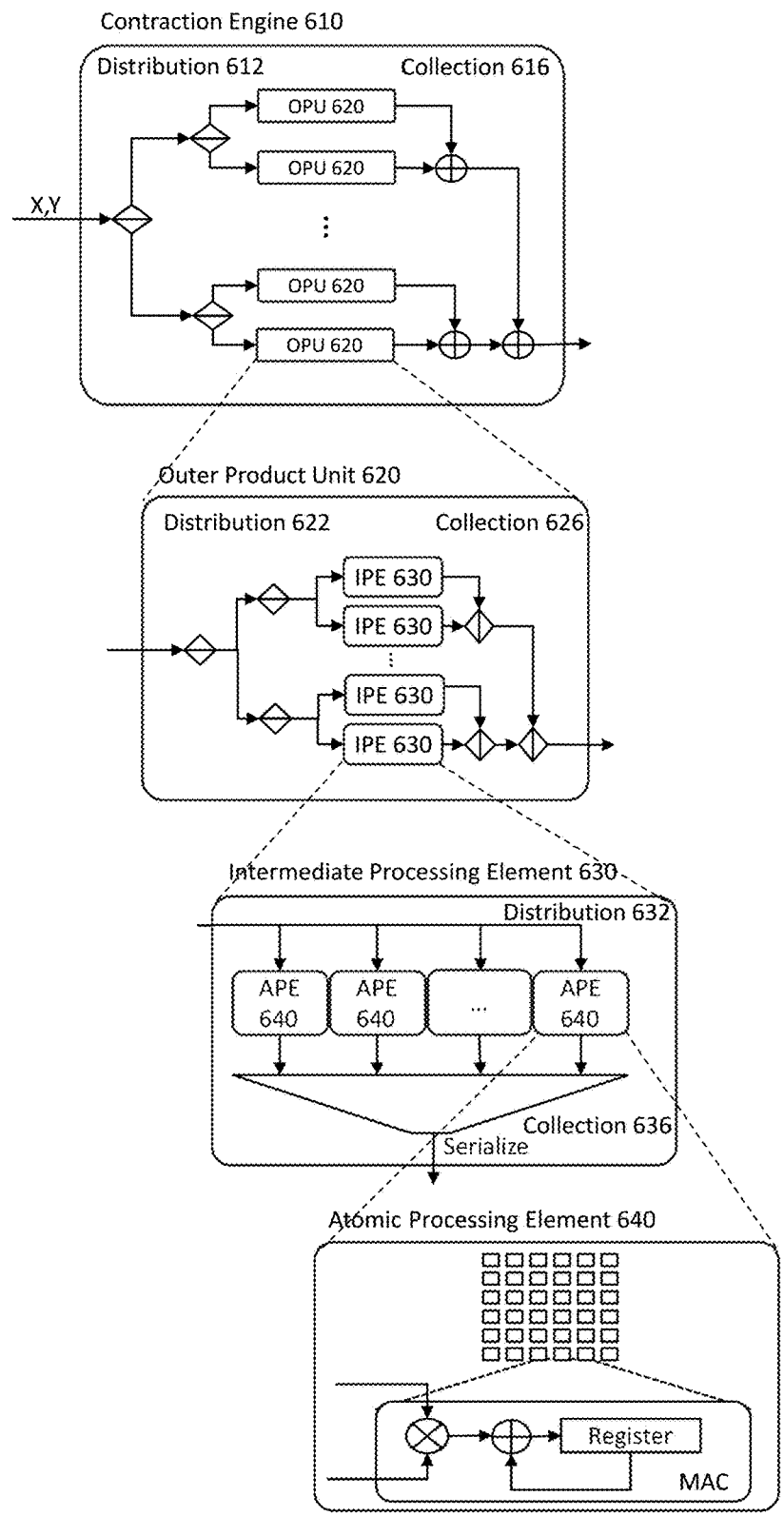
FIG. 6 illustrates an example implementation of a contraction engine.

FIG. 6 illustrates an example implementation of a contraction engine 610, which uses a hierarchical architecture. The contraction engine 610 includes a parallel array of outer product units (OPUs) 620. Each OPU 620 includes a parallel array of intermediate processing elements (IPEs) 630. Each IPE 630 includes multiple atomic processing elements (APEs) 640. Each APE 640 uses multiply-accumulate circuits (MACs). Thus, the contraction engine 610 provides a certain level of hardware parallelism down to the APEs 640. The APEs are data independent of each other, in the sense that the data required by each APE for its calculation does not depend on the results of the calculation of any other APE. Time division multiplexing may be used to accommodate larger size tensors if the hardware parallelism alone is not sufficient.

At a high level, the contraction engine 610 partitions the full matrix multiply X×Y into outer products that can be handled by the OPUs 620. The distribution section 612 and collection section 616 implement the partitioning and its reversal, which scatters 612 and reduces 616 with respect to the contraction index k. Within the OPU, the atomic outer product calculations are ultimately performed by the APEs 640. Because the APEs include MACs, they can perform the multiplies to calculate the atomic outer products but they can also accumulate element-wise sums across the contraction index k. The IPEs 630 are an intermediate layer that implements the partitioning from the OPU level down to the APE level. In this example, there is one intermediate layer, which scatters/broadcasts 622,632 and gathers 626,636 only with respect to the free indices i,j, but other OPU designs can use different numbers of intermediate layers and may also partition with respect to the contraction index k.

In the contraction engine shown in FIG. 6, the scattering along the contraction index k is implemented by the contraction engine-OPU hardware partitioning and also by time division multiplexing and the accumulate function in the APEs. The scattering along the free indices i,j is implemented by the OPU-IPE and IPE-APE hardware partitions, and also by additional time division multiplexing as needed.

Figure 7A:
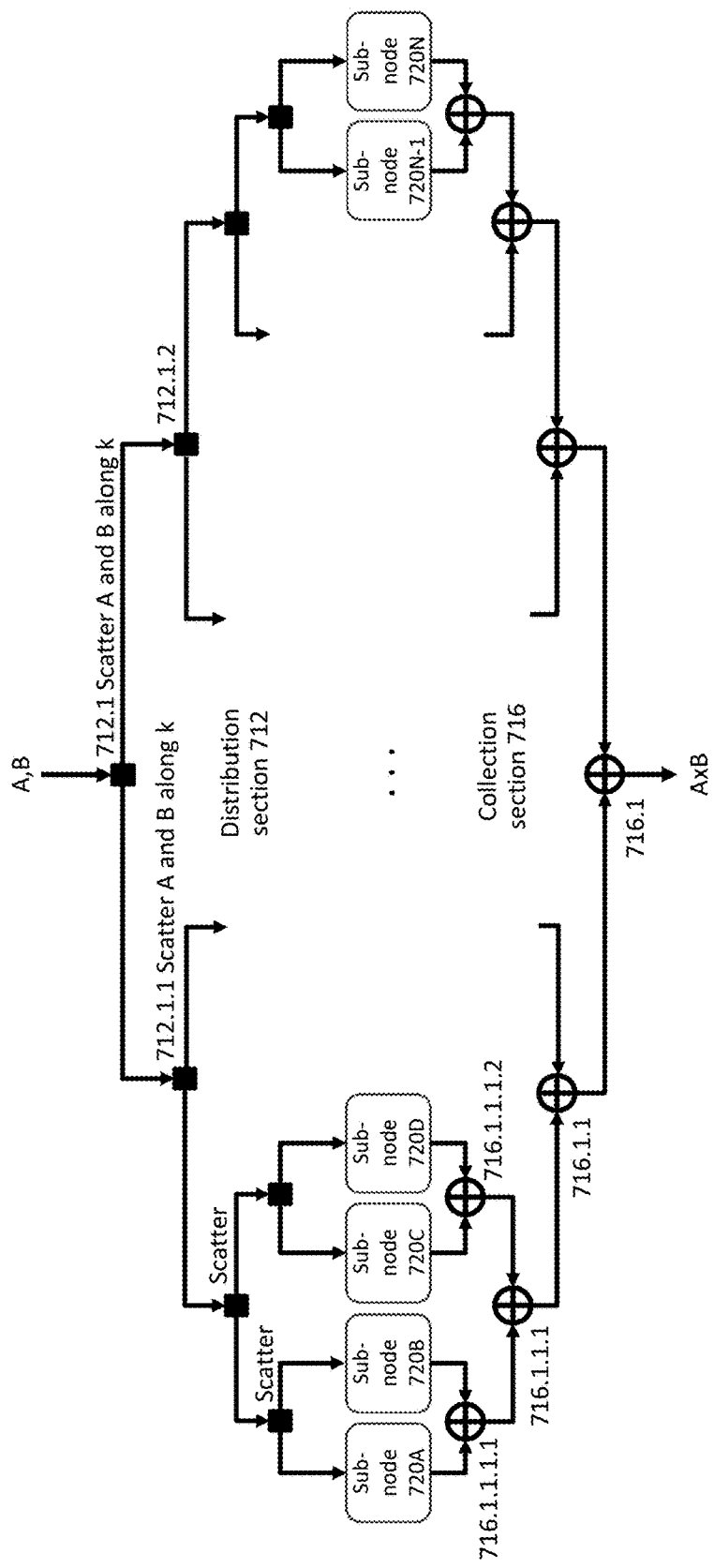
FIG. 7A is a block diagram showing the use of binary trees in a node that scatters along the contraction index k.

FIG. 7A is a block diagram showing the use of binary trees in a node that scatters along the contraction index k. This approach could be used for the scatter/reduce 612/616 in the contraction engine 610 of FIG. 6. In that case, the node in FIG. 7A would be the contraction engine 610 and the sub-nodes in FIG. 7A would be the OPUs. In FIG. 7A, each solid black box in the distribution section 712 is a collective streaming element (CE) that scatters the incoming matrices A and B along the contraction index k. FIG. 7A shows a four-level distribution section 712 that partitions the incoming matrices to 16 sub-nodes 720A-N. Column A1 and row B1 from matrices A and B are directed to sub-node 720A, column A2 and row B2 are directed to sub-node 720B and so on. At the top level CE 712.1, columns A1-A8 and rows B1-B8 are directed to the left branch and columns A9-A16 and rows B9-B16 are directed to the right branch. At the second level CE 712.1.1, columns A1-A4 and B1-B4 are directed to the left branch and columns A5-A8 and rows B5-B8 are directed to the right branch. And so on down to the sub-nodes 720. Each split may be implemented in hardware or using time division multiplexing, as described previously. Different techniques may be used for different levels.

The collection section 716 reverses the distribution section 712 by summing the component matrix multiplies. Let Cn=An×Bn, which is the result produced by sub-node 720n. CE 716.1.1.1.1, which is a summer, adds C1+C2 from sub-nodes 720A and 720B, CE 716.1.1.1 adds (C1+C2) and (C3+C4) from summers 716.1.1.1.1 and 716.1.1.1.2, and so on to the top-level CE 716.1. The CEs can be implemented as a binary tree, as shown. In that case, there are a total of 8+4+2+1=15 summers. Alternately, the sums can be accumulated in registers or memory locations, in which case 8 accumulators can be used. For example, the summers 716.1.1.1, 716.1.1.1, 716.1.1, and 716.1 can all be implemented in the same accumulator.

Figure 7B:
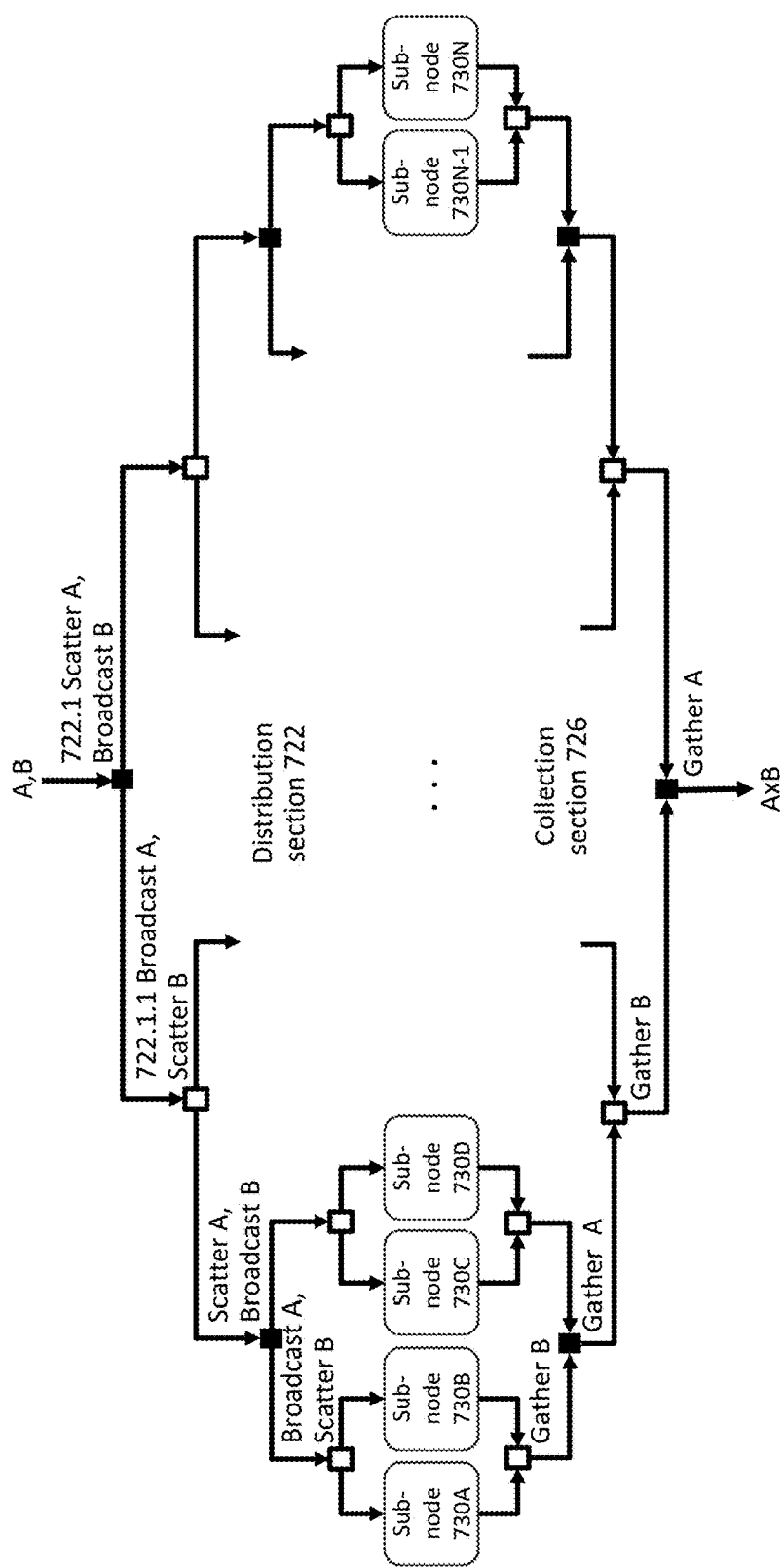
FIG. 7B is a block diagram showing the use of binary trees in a node that scatters along the free indices i,j.

FIG. 7B is a block diagram showing the use of binary trees in a node that scatters along the free indices i,j. This approach could be used for the scatter/gather 622/626 in the outer product unit 620 of FIG. 6. In that case, the node in FIG. 7B would be the OPU and the sub-nodes would be the IPEs. In FIG. 7B, each solid black box in the distribution section 722 is a CE that scatters the incoming matrices A and B along the free index i (i.e., scatters A and broadcasts B) and each white box is a CE that scatters the matrices along the free index j (i.e., broadcasts A and scatters B). The black and white boxes in the collection section 726 are CEs that perform the reverse merging functions. FIG. 7B shows a four-level distribution section 722 that partitions the incoming matrices to 16 sub-nodes 730A-N. A is partitioned into A(1)-(4) and B is partitioned into B(1)-(4). A(1) and B(1) are directed to sub-node 730A, A(1) and B(2) to sub-node 730B, A(2) and B(1) to sub-node 730C, A(2) and B(2) to sub-node 730A and so on to A(4) and B(4) are directed to sub-node 730N. At the top level split 722.1, A(1)-(2) are directed to the left branch, A(3)-(4) are directed to the right branch, and B(1)-(4) are broadcast to both branches. At the second level split 722.1.1, A(1)-(2) are broadcast to both branches, B(1)- (2) are directed to the left branch, and B(3)-(4) are directed to the right branch. And so on down to the sub-nodes 730. Each split may be implemented in hardware or using time division multiplexing, and different techniques may be used for different levels of splitting.

The collection section 726 reverses the distribution section 722 by merging the component matrix multiplies. These can be implemented by hardware parallelism or by time division multiplexing. It can also be implemented by the controller and output buffer (or local storage) storing each component at the right location for the output tensor. In that case, there may be no physical circuitry that correspond directly to the black and white boxes in the collection section 726.

Figure 8A:
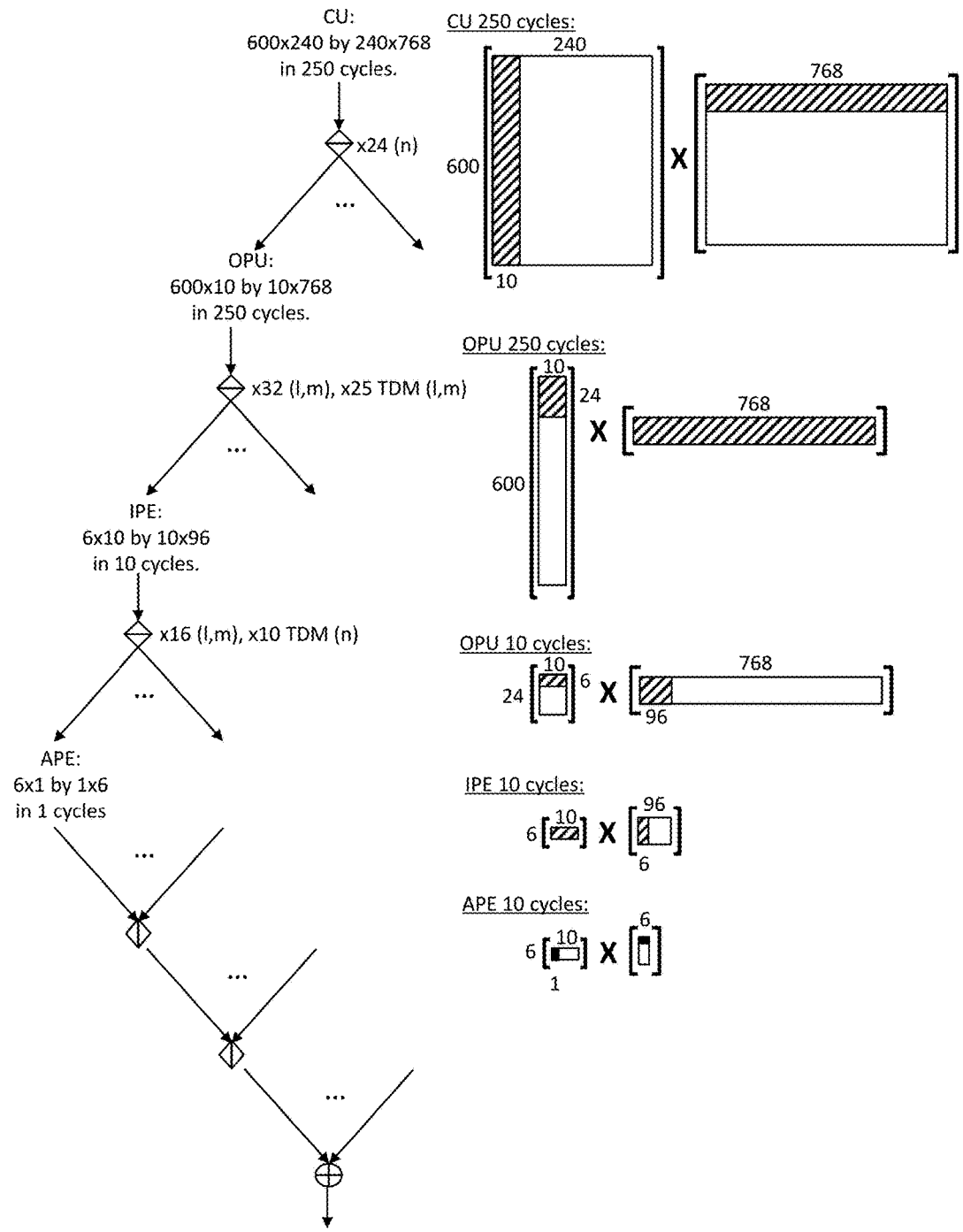
FIG. 8A illustrates partitioning of a matrix multiply using the contraction engine of FIG. 6.
Figure 8B:
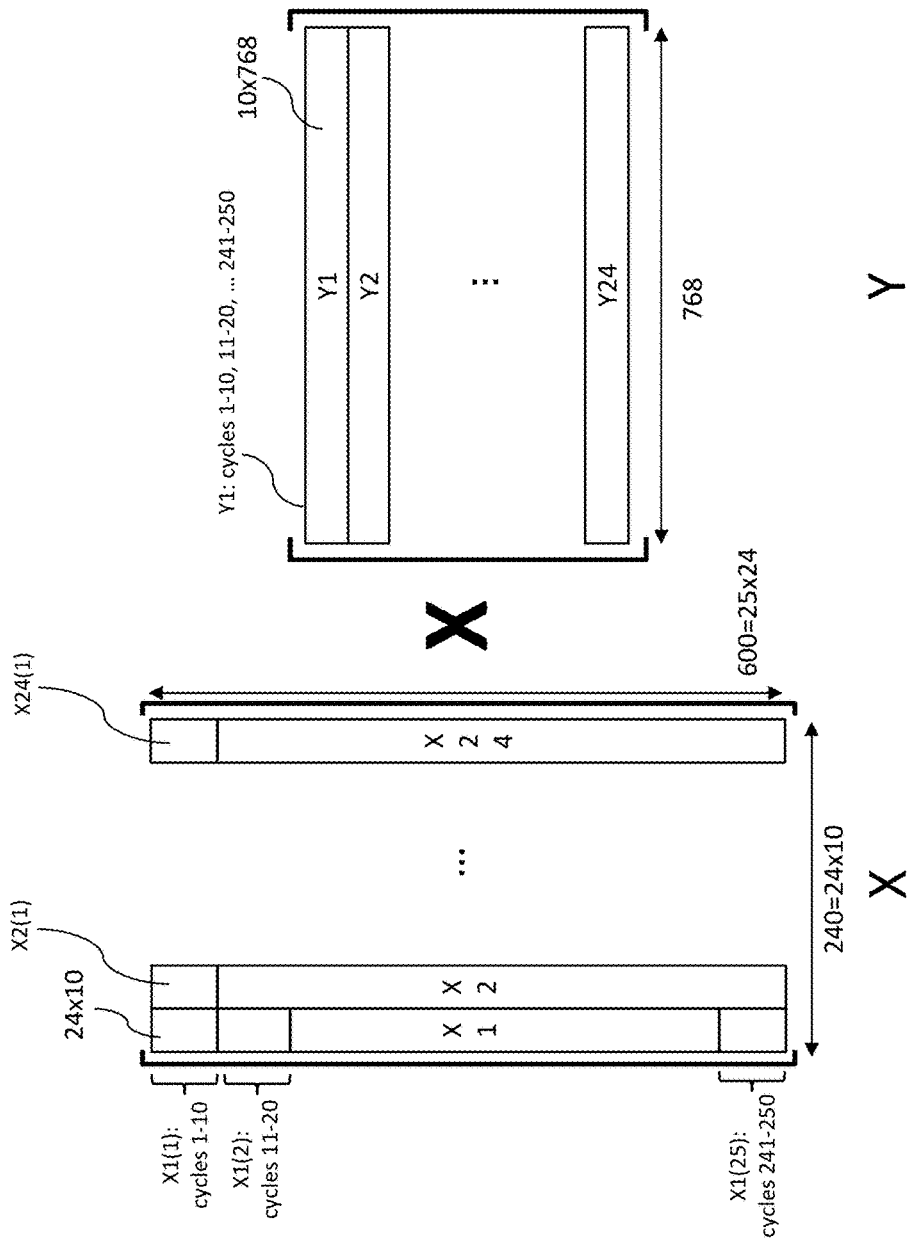
FIGS. 8B-8C illustrate scheduling aspects of the matrix multiply of FIG. 8A.
Figure 8C:
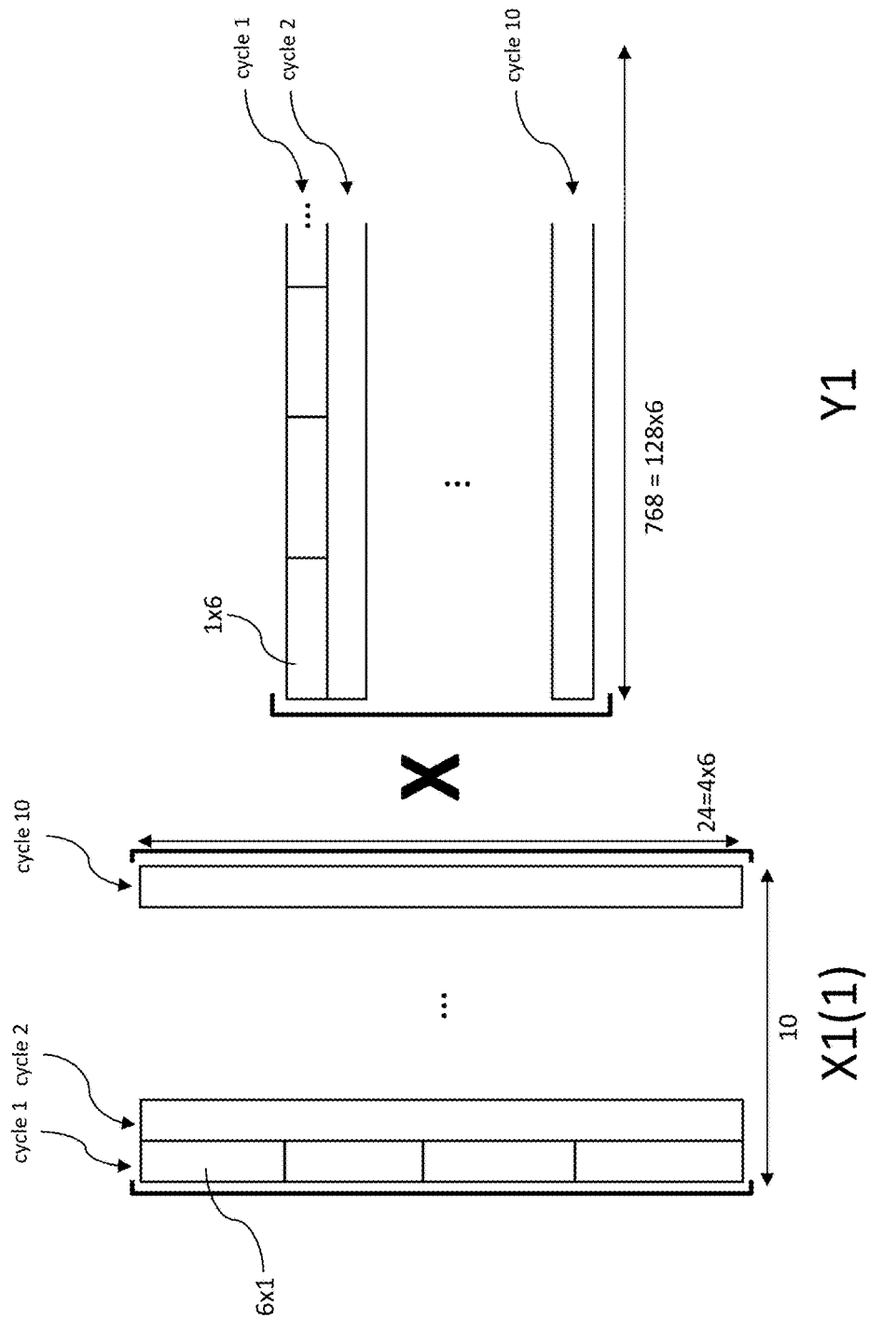

FIGS. 8A-8C illustrate a numerical example of a matrix multiply using the contraction engine of FIG. 6. The input tensors TX and TY have equivalents of 600×240 matrix X and 240×768 matrix Y. Thus, the contraction engine performs a 600×240 by 240×768 matrix multiply. In this example, the contraction engine 610 has 24 OPUs, each OPU has 32 IPEs, and each IPE has 16 APEs. Each APE can calculate an outer product $\alpha \times \beta$ in a single clock cycle, where $\alpha$ is an $\iota \times 1$ column vector and $\beta$ is a $1 \times \varphi$ row vector ($\iota$ and $\varphi$ are the Greek symbols for lowercase i and j, respectively), and also accumulates these outer products over multiple clock cycles. In this example, $\iota = \varphi = 6$. Each APE calculates a 6×1 by 1×6 outer product in one clock cycle. In the following description, clock cycles are the number of clock cycles used by the APE to calculate the outer products. For simplicity, clock cycles used to retrieve or transfer data are neglected.

The total calculation requires 600×240×768=110,592,000 scalar multiplies. With the hardware parallelism, the contraction engine contains 24×32×16=12,288 APEs, each of which can calculate 36 scalar multiplies per cycle, for a total of 442,368 scalar multiplies per cycle. Therefore, the total calculation requires 110,592,000/442,368=250 cycles.

In FIG. 8A, the tree to the left shows the partitioning of the 600×240 by 240×768 matrix multiply into the 6×1 by 1×6 atomic outer products. Each layer in the tree shows the calculation performed by the processing node of that layer. The scatter symbols between layers show the amount of hardware and time division multiplexing (TDM) partitioning and along which indices. The right side of FIG. 8A graphically shows the partitioning of the matrix multiplies. In those figures, the clear boxes show the size of the matrices before scattering and the hashed boxes show the size of the matrices after scattering. The numbers to the left and top of the clear boxes show the size before scattering, and the numbers to the right or bottom of the hashed boxes show the size after scattering.

Starting at the top, the contraction engine (or contraction unit CU) calculates a 600×240 by 240×768 matrix multiply in 250 cycles. On the right, the matrix multiply labelled "CU 250 cycles" show the 600×240 X matrix and 240×768 Y matrix as clear boxes. The contraction engine includes 24 OPUs. Therefore, the problem is partitioned by a factor of 24 along the contraction index n, as denoted by the "×24 (n)" label for the topmost scatter symbol. After this partitioning, each OPU handles a 600×10 by 10×768 matrix multiply in 250 cycles. In the matrix multiply labelled "CU 250 cycles", this is indicated by the hashed boxes with the "10" below the hashed box.

From the OPU to the IPEs, for reasons that will be described below, each IPE can handle a 6×10 by 10×96 matrix multiply in 10 cycles. This requires a partitioning by a factor of 800 from the OPUs. The ×800 partitioning is implemented as ×32 in hardware parallelism (32 IPEs per OPU) and ×25 in TDM. Both the hardware and TDM partitioning are with respect to the free indices l,m. On the right side of FIG. 8A, the matrix multiply labelled "OPU 250 cycles" show the TDM partitioning. The OPU executes a 600×10 by 10×768 matrix multiply in 250 cycles, which is partitioned as the OPU executing one 24×10 by 10×768 matrix multiply every 10 cycles. "OPU 10 cycles" show the hardware parallelism. The OPU executes a 24×10 by 10×768 matrix multiply every 10 cycles, which is spread among 32 IPEs, each of which executes a 6×10 by 10×96 matrix multiply every 10 cycles.

From the IPE to the APEs, there is a hardware partitioning by a factor of ×16 with respect to the free indices l,m. This reduces the 6×10 by 10×96 matrix multiply every 10 cycles to a 6×10 by 10×6 matrix multiply every 10 cycles, as shown by the matrix multiply labelled "IPE 10 cycles." There is also a TDM partitioning by a factor of ×10 with respect to the contraction index n, which reduces the 6×10 by 10×6 matrix multiply every 10 cycles to a 6×1 by 1×6 matrix multiply every 1 cycle, as shown by the matrices labelled "APE 10 cycles." This last partitioning takes advantage of the APEs' ability to accumulate sums over the contraction index n.

The original matrix multiply could be partitioned in other ways, but the partitioning shown above has some advantages. First, referring to FIG. 6, note that scattering with respect to the contraction index n occurs either at the CU-OPU level or within the APE. Any scattering along n that cannot be handled by the hardware parallelism at the CU level is implemented by TDM at the APE level because the APEs can accumulate over n. In this example, the 600×240 by 240×768 matrix multiply requires a ×240 partitioning in n. The CU-OPU can achieve ×24 in hardware parallelism. This leaves ×10 TDM, which is implemented entirely in the APE. So the APEs perform 6×10 by 10×6 matrix multiplies in 10 cycles. If part of the ×10 were implemented elsewhere, then additional summers or accumulators would be used.

There are 16 APEs in each IPE. That ×16 could be allocated in different ways, but here is it allocated entirely to the free index m. Each IPE then performs a 6×10 by 10×96 matrix multiply in 10 cycles. This is advantageous for the following reason. Let A(1:6,1:10) be the 6×10 matrix and B(1:10,1:96) be the 10×96 matrix. With this partitioning, A(1:6,1:10) is broadcast to each of the 16 APEs within an IPE, which reduces moving around of data. The B(1:10,1:96) are split among the 16 APEs, with B(1:10,1:6) going to the first APE, B(1:10,7:12) going to the second APE, . . . and B(1:10,91:96) going to the 16th APE.

Finally, if each IPE handles a 6×10 by 10×96, and each OPU handles a 600×10 by 10×768, then there is a ×800 partitioning from OPU to IPE. Hardware parallelism provides ×32, leaving ×25 for TDM. The ×25 TDM increases the calculation time from 10 cycles×25=250 cycles.

FIGS. 8B and 8C illustrate the above example, but from a time perspective. FIG. 8B shows the 600×240 by 240×768 matrix multiply X×Y, which is completed in 250 cycles. The matrices are divided into block columns X1 . . . X24 and block rows Y1 . . . Y24, and each OPU will calculate one of the outer products Xn×Yn in the 250 cycles. FIG. 8B shows further details for the outer product X1×Y1. Block column X1 is subdivided into 25 sub-columns X1(1) . . . X1(25). In cycles 1-10, OPU #1 calculates X1(1)×Y1, which is shown in FIG. 8C. In cycles 11-21, OPU #1 calculates X1(2)×Y1. And so on. Similarly, in cycles 1-10, OPU #2 calculates X2(1)×Y2 and OPU #24 calculates X24(1)×Y24. After cycles 1-10, these outer products can be summed as X1(1)× Y1+X2(1)×Y2+ . . . +X24(1)×Y24 to produce the top 24 rows of the product X×Y. The next 24 rows are produced during cycles 11-20, and so on.

FIG. 8C shows the 24×10 by 10×768 matrix multiply X1(1)×Y1, which is completed in 10 cycles. X1(1) contains 10 columns and Y1 contains 10 rows. On each cycle, the outer product of one column and one row is calculated by the OPU. The columns and rows are divided into 6×1 and 1×6 chunks for the APEs. Each OPU includes 32×16=512 APEs. Each column is divided into 4 6×1 sub-columns, and each row is divided into 128 1×6 sub-rows, yielding a total of 512 combinations of sub-columns and sub-rows. Each of these is assigned to one of the APEs. On cycle 1, each APE calculates the 6×1 by 1×6 outer product based on its assigned sub-sections of the first column and first row. On cycle 2, each APE calculates the outer product based on the same sub-sections of the second column and row, adding it to the previous result (i.e., reducing over the contraction index n), and so on until cycle 10 and the tenth column and row. After 10 cycles, each of the 512 APEs will have accumulated a 6×6 portion of the outer product X1(1)×Y.

Note that in FIG. 8B, block column X1 is drawn as containing columns 1-10 of matrix X. This is for convenience. During cycle 1, OPU #1 is operating on column 1 of block column X1(1), but OPU #2 is simultaneously operating on column 1 of block column X2(1) which is column 11 of matrix X, and so on. As drawn in FIG. 8B, this would require the retrieval of columns 1, 11, 21, . . . 231 of matrix X for cycle 1. It may be more efficient to retrieve columns 1, 2, 3, . . . 24 for cycle 1. That can be achieved by defining block column X1 as containing columns 1, 25, 49, . . . 217; block column X2 as containing columns 2, 26, . . . 218; and so on.

In the example above, cycles were based on clock cycles for computation in the APE. Cycles for data transfer were not included. This was done partly for clarity of explanation, but partly because the architecture described is well suited to reduce delays due to data transfer. For example, referring to FIG. 6, note that the MACs in the APEs are the only calculation circuitry. The rest of the contraction engine is used primarily to direct tensor elements from the input buffer to the correct APE at the correct time, and to reverse this after calculation by the APEs. That is, the "intermediate processing element" is primarily a collection of APEs and data routing and may be implemented without any "processing elements" beyond those in the APEs themselves.

As a result, data transfer can be asynchronous with data simply flowing through the various distribution and collection sections to/from the APEs, reducing the number of clocked registers. In the numerical example above, the contraction engine 610 contained 12,288 APEs. In an asynchronous approach, the input to the contraction engine 610 is 12,288 lines wide, with one line leading to each of the APEs. The routing is done using parallel hardware data paths without clocking between the engine input and the APEs. If the data paths are so long that they introduce a delay greater than one clock cycle, then registers may be inserted along the data paths to maintain data alignment over multiple clock cycles.

The width of the data paths can be reduced by using time division multiplexing. Even in that case, where data is clocked into registers, the data flow through the contraction engine can be pipelined to reduce waiting time for data to arrive before a computation. Preferably, all data transfer is either asynchronous or pipelined. For example, an APE that calculates a 6×1 by 1×6 outer product uses 12 elements to produce the outer product. Data may be transferred from the input buffers to the APEs using TDM pipelining of 12-element packets. Within the APE, these 12 elements may be distributed to the MAC array in parallel rather than sequentially. Thus, the column vector and row vector are loaded into the MAC array in one cycle, and the MAC calculation is performed in the next cycle. Meanwhile, the next 12-element packet is received in a pipelined fashion.

As another example, consider the IPE 630 shown in FIG. 6. For this example, assume that the IPE 630 contains eights APEs 640, each of which can complete its calculation in one clock cycle. However, because the outputs are TDM, the result from only one APE can be output on every clock cycle, thus requiring eight clock cycles to read out the results from all eight APEs. The APEs are idling for seven of eight cycles, waiting for the output multiplexer to catch up to the calculations. Alternately, the APEs could accumulate over the contraction index k for eight cycles. In that case, it will take eight clock cycles to complete the multiply-accumulate. By staggering the execution order, each APE can be read out once every eight cycles, thus increasing utilization of the APEs.

The example above was for a specific size matrix multiply with L=600, M=768 and N=240. Given these values of L, M, N, the matrix multiply was partitioned in a certain way using a combination of hardware parallelism and TDM. The controller 280 (in FIG. 2) controls the actual execution. For example, it controls the timing of the transfer of elements from the input buffer 290 to the contraction engine 210. It controls TDM timing. The APE accumulates outer products over sequences of 10 cycles. The controller identifies when to reset the accumulator, when to accumulate and when to stop accumulation. For convenience, the controller 280 is drawn as a separate box in FIG. 2, but it does not have to be implemented as such. The controller 280 could be distributed, with some control functions implemented within other components of the native tensor processor. Some control functions can also be handled outside the controller 280 or even outside the native tensor processor. For example, retrieving chunks of tensor data may be controlled by firmware outside the native tensor processor, and determining the partitioning strategy may be performed by software running on a host processor.

In another aspect, the native tensor processor can accommodate tensors TX and TY of different sizes L, M and N. The partitioning will be different based on the values of L, M, N, and the configuration of the components within the native tensor processor will also be different based on the values of L, M, N. Much of that is handled by the controller.

For example, scattering of the contraction index n was allocated between the reduction section (i.e., collection section) in the OPU and the accumulation function in the APEs. For different values of N, the number of accumulation cycles in the APE may be different. In addition, the hardware parallelism in the OPU may change and/or outer products may be accumulated at the OPU level (not shown in the examples above) in addition to at the APE level. Reduction of the contraction index n may occur at any level.

Scattering of the free indices l,m was implemented primarily by TDM and by hardware parallelism in the OPUs and IPEs. Changes in the TDM can be implemented by controlling the release of elements from the input buffer to the contraction engine. Within the contraction engine, physical multiplexers and demultiplexers can also be configured to provide different levels of multiplexing. Hardware parallelism can also be changed, for example by using switches.

In the example above, the IPE included 16 APEs. Assume the IPE calculates A×B. In the example above, A was broadcast to all 16 APEs. B was divided into 16 parts B(1)-(16), each of which was sent to one of the APEs. Call this a 1×16 configuration for the IPE. For other values of L, M, N, the IPE may use different configurations. The binary-based configurations are 1×16, 2×8, 4×4, 8×2 and 16×1. The IPE preferably is hardware configurable and the controller typically will set the IPE configuration. For configurations that change infrequently (e.g., set once for the duration of the matrix multiply), the configuration may be determined by control registers that are programmed by the controller. In this example, the "shape" of the hardware parallelism is configurable, but the amount of hardware parallelism is fixed at ×16.

Figure 9:
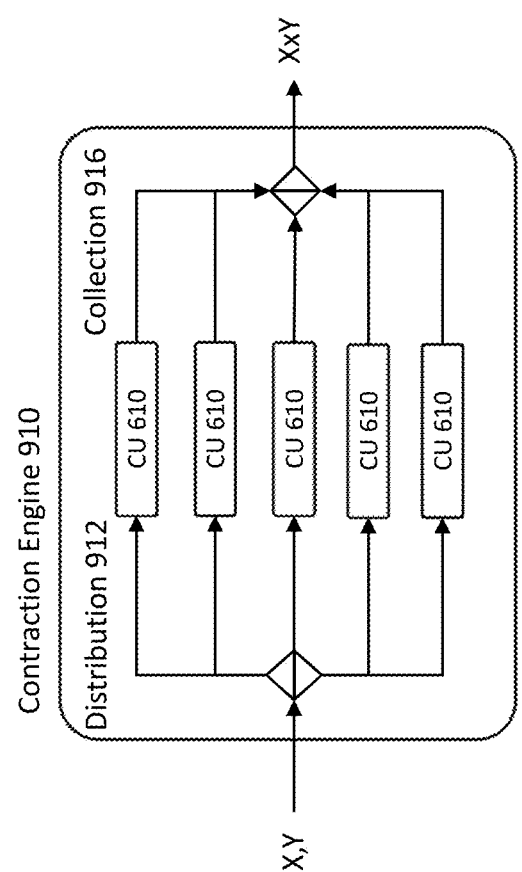
FIG. 9 illustrates expanding the hardware capacity of a contraction engine.

The amount of hardware parallelism can be increased by adding more hardware with corresponding distribution and collection sections. The above architecture is scalable with additional computing resources recursively organized to handle different shapes of workloads. For example, the numerical example above included a ×25 TDM along l,m, requiring 250 cycles for the full matrix multiply. This could be reduced by adding more contraction engines in parallel, as shown in FIG. 9. In this example, the new contraction engine 910 includes five of the old contraction engines/units 610 from FIG. 6. The distribution section 912 scatters along the i index and the collection section 916 reverses this. Each of the old contraction engines 610 now completes a 120×240 by 240×768 matrix multiply in 50 cycles. These are merged together to produce the full result of a 600×240 by 240×768 matrix multiply in 50 cycles. As a result of the partitioning that is available from taking an approach based on outer products, more processing nodes can be added in parallel by layering on more distribution and collection sections.

Figure 11:
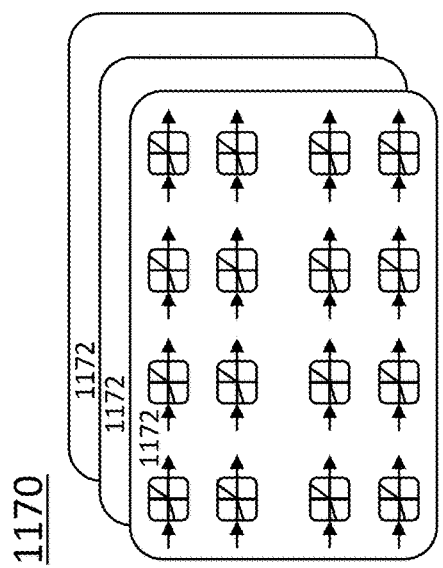
FIG. 11 is a block diagram of an activation engine.
Figure 10:
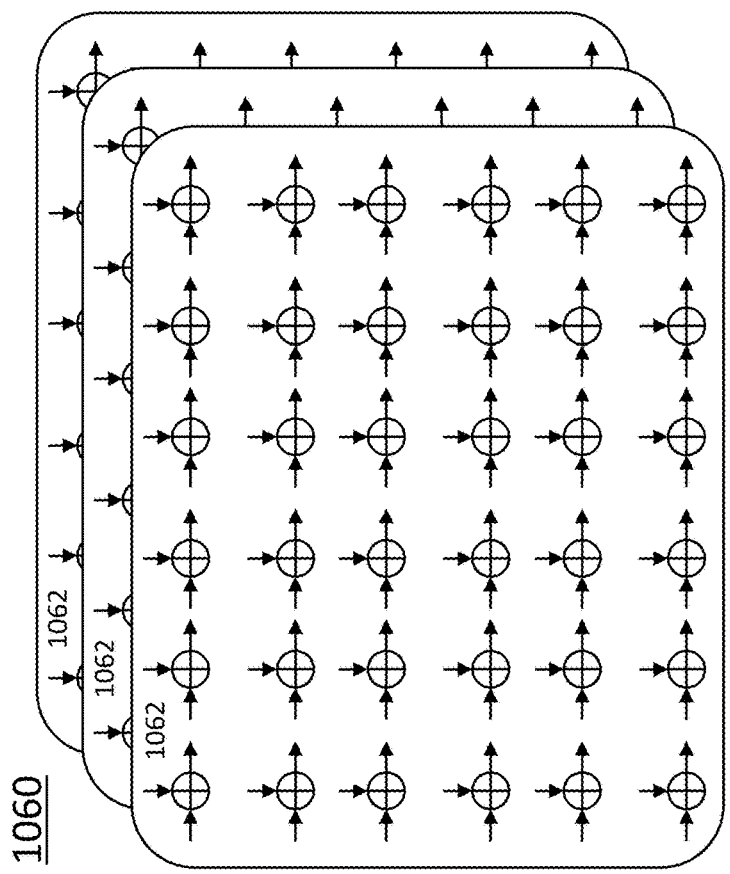
FIG. 10 is a block diagram of an element processing engine.

In FIG. 2, the native tensor processor also included an element engine 260 and an activation engine 270. FIG. 10 is a block diagram of an element processing engine 1060. In this example, the engine 1060 includes multiple 36-wide arrays 1062 that perform element-wise operations, such as add, subtract, multiply and divide. In this example, each array 1062 is a 6×6 array to match the size and shape of the APEs, which produce 6×6 outer products. FIG. 11 is a block diagram of an activation engine 1170. In this example, the engine 1170 includes multiple 16-wide arrays 1172 that apply non-linear functions on a per-element basis.

Additional flexibility may be added by the choice of implementation of various hardware elements. For example, the APE in this example calculated a 6×1 by 1×6 outer product of column vector α and row vector β. In one implementation, the APE contains a 6×6 array of MACs. The elements of column vector α are broadcast to the six columns of the array, and the elements of row vector β are broadcast to the six rows of the array.

In an alternate implementation, the APE is structured as an element-by-element multiply of two 6×6 arrays. In that case, the column vector α is replicated six times to produce one of the arrays and the row vector β is replicated six times to produce the other array. This approach has more flexibility because it can also calculate a straight element-by-element multiply of two 6×6 arrays. Convolution of a 4×4 array by a 3×3 kernel can also be calculated through use of the Winograd transform. The APE can include a pre-transform engine that selects between these options. If the Winograd transform is selected, then the APE implements a convolution. If replication of the column and row vectors is selected, then the APE implements an outer product. If no pre-transform is selected, then the APE implements an element-wise 6×6 multiplication. The pre-transform can be implemented earlier in the data flow, typically with a tradeoff between bandwidth and area.

Figure 13:
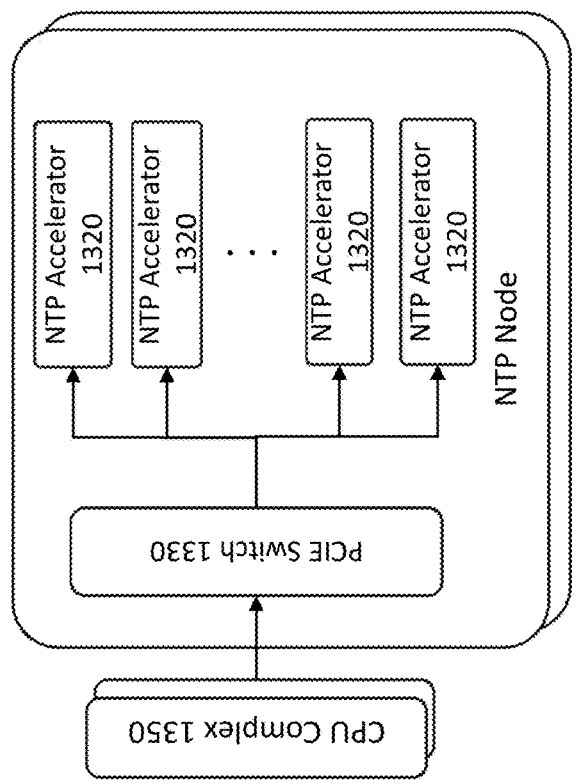
FIG. 13 is a block diagram illustrating native tensor processor clusters.
Figure 12:
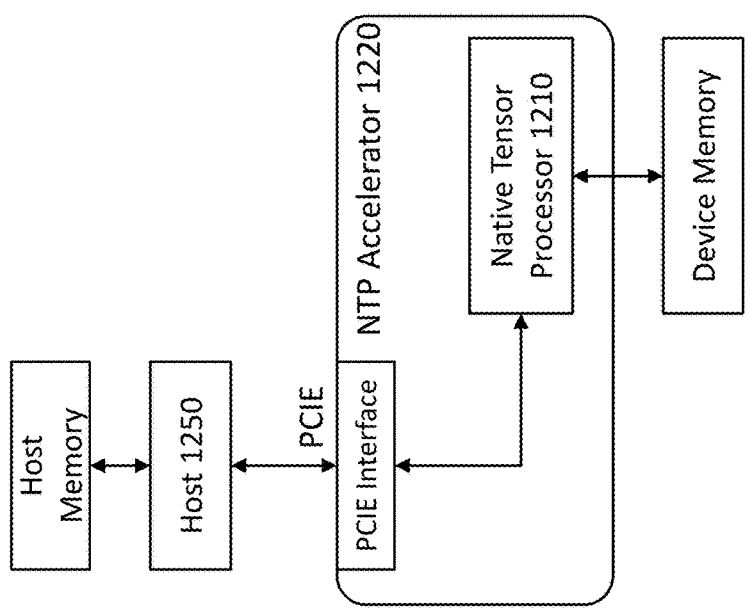
FIG. 12 is a block diagram of a native tensor processor used as an accelerator.

FIGS. 12-13 are examples of computer systems which includes both native tensor processors and conventional processors. FIG. 12 is a block diagram of a computer system in which the native tensor processor is used as an accelerator. The conventional processor is the host 1250, and the native tensor processor 1210 is used to accelerate tensor calculations under control of the host. Applications run on the host 1250, which identifies tensor contractions (or other tensor operations) to be executed and assigns these to the native tensor accelerator 1220 for execution. In the example of FIG. 12, the host 1250 and accelerator 1220 interface to each other using PCIExpress. They have separate memories, although they could also access a shared memory in alternate designs.

In FIG. 13, the native tensor subsystem includes multiple native tensor accelerators 1320. Both the conventional processors 1350 and the native tensor processors 1320 are organized into clusters or nodes connected by a PCIExpress switch 1330. The tensor processors can be configured and scaled according to requirements of the tensor contractions to be executed. For larger tensor operations, more tensor processors 1320 may be organized to provide more hardware capacity, as described above, or to provide redundancy against failure. The native tensor processors 1320 may also be shared by multiple processors 1350, thus increasing their overall utilization. The native tensor processors may be virtualized or made available to third parties as a cloud service.

In another application, multiple native tensor processors are connected to each other in a manner to provide native tensor supercomputer capability. The collective streaming architecture described above has many of the attributes of the collective communication approach to high performance computing.

Systems that include both tensor processors and other processors can take a variety of different forms and physical implementations. The native tensor subsystem can have one or more native tensor processors, and the processor subsystem can also have one or more processors. In order of increasing size, the conventional processors and native tensor processors could be implemented as different processors cores on a same integrated circuit, or as different die in a multi-chip module. Alternately, they may be implemented as separated integrated circuits on a printed circuit board. For larger systems, implementation might be blades or racks in a rack system, or implementation as part of a server farm.

Depending on the physical implementation, the communications between processors may also take different forms. Examples include dedicated communications channels, such as hardwired communication paths between different cores in an integrated circuit or by accessing common registers or memory locations. At the large end of the scale, examples include local area and other types of networks.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A computer system comprising:
   a processor subsystem having at least one processor; and
   a native tensor subsystem having at least one native tensor processor implemented on a single integrated circuit, the native tensor processor comprising a contraction engine that calculates a contraction of tensors TX and TY by executing calculations that effect a matrix multiplication X×Y=Z, where X is an unfolded matrix for tensor TX and Y is an unfolded matrix for tensor TY, the contraction engine comprising:
      a plurality of outer product units (OPUs) that calculate matrix multiplications by a sum of outer products;
      a distribution section coupled to the plurality of outer products, the distribution section partitioning the X×Y matrix multiplication with respect to a contraction index k into a plurality of Xk×Yk outer products and directing the Xk×Yk outer products to the OPUs; and
      a collection section coupled to the plurality of OPUs, the collection section summing the outer products calculated by the OPUs into a product for the matrix multiplication.

2. The system of claim 1 wherein the processor subsystem plays a role of host, and the native tensor subsystem plays a role of accelerator under control of the host.

3. The system of claim 2 wherein the host identifies tensor contractions to be executed and assigns the tensor contractions to the accelerator for execution.

4. The system of claim 2 wherein the host interfaces to the accelerator using PCIExpress.

5. The system of claim 2 wherein the host and the accelerator access separate memories.

6. The system of claim 2 wherein the host and the accelerator access a shared memory.

7. The system of claim 1 wherein the native tensor subsystem has a plurality of native tensor processors.

8. The system of claim 7 wherein the native tensor processors are configurable by the processor subsystem according to requirements of tensor contractions to be executed.

9. The system of claim 8 wherein the processor subsystem configures multiple native tensor processors to operate in parallel to execute a tensor contraction, and the tensor contraction is partitioned among the multiple native tensor processors.

10. The system of claim 9 wherein the tensor contraction is partitioned among the multiple native tensor processors with respect to a contraction index for the tensor contraction.

11. The system of claim 8 further comprising a PCIExpress switch connecting the processor subsystem to the plurality of native tensor processors.

12. The system of claim 7 wherein the processor subsystem virtualizes a capacity of the native tensor processors, and tensor contractions are partitioned among the virtual native tensor processors.

13. The system of claim 7 wherein a capacity of the native tensor processors is available to third party users as a cloud service.

14. The system of claim 7 wherein the native tensor processors are coupled to each other by dedicated communications channels.

15. The system of claim 7 wherein the native tensor processors are coupled to each other by a local area network.

16. The system of claim 7 wherein the plurality of native tensor processors provide redundancy against failure of a native tensor processor.

17. The system of claim 7 wherein the plurality of native tensor processors are connected in a manner to provide native tensor supercomputer capability.

18. The system of claim 1 wherein the processor subsystem and native tensor subsystem are implemented as separate integrated circuits on a single circuit board.

19. The system of claim 1 wherein the processor subsystem and native tensor subsystem are implemented as separate blades in a rack system.

20. The system of claim 1 wherein the processor subsystem and native tensor subsystem are implemented on a same integrated circuit.

* * * * *